United States Patent
Kitagata

(10) Patent No.: US 8,493,591 B2
(45) Date of Patent: Jul. 23, 2013

(54) JOB-SUBMISSION-REQUEST APPARATUS AND METHOD FOR MAKING A REQUEST FROM A PLURALITY OF APPARATUSES

(75) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 12/198,667

(22) Filed: Aug. 26, 2008

(65) Prior Publication Data

US 2009/0059284 A1 Mar. 5, 2009

(30) Foreign Application Priority Data

Aug. 28, 2007 (JP) ................. 2007-221679

(51) Int. Cl.
*G06F 3/12* (2006.01)
(52) U.S. Cl.
USPC ........ 358/1.15; 358/1.14; 358/1.16; 709/201; 709/203; 709/223; 709/226
(58) Field of Classification Search
USPC ................ 358/1.15, 1.16; 709/201, 203, 205, 709/223, 226
See application file for complete search history.

(56) References Cited

U.S. PATENT DOCUMENTS

| | | | |
|---|---|---|---|
| 6,115,132 A * | 9/2000 | Nakatsuma et al. | 358/1.14 |
| 2003/0128384 A1 * | 7/2003 | Nelson et al. | 358/1.15 |
| 2006/0244991 A1 * | 11/2006 | Tenger et al. | 358/1.15 |
| 2007/0146778 A1 * | 6/2007 | Kitagata et al. | 358/1.15 |
| 2007/0260669 A1 * | 11/2007 | Neiman et al. | 709/201 |

FOREIGN PATENT DOCUMENTS

JP 2006-313442 11/2006

OTHER PUBLICATIONS

English Machine Translation of JP 2006-313442-A (Takashi, Published Nov. 16, 2006).*

* cited by examiner

*Primary Examiner* — Benny Q Tieu
*Assistant Examiner* — Juan M Guillermety
(74) *Attorney, Agent, or Firm* — Canon USA Inc. IP Division

(57) ABSTRACT

Under circumstances where each of a plurality of servers controls print jobs submitted to at least one output apparatus, jobs intended for the same printer are submitted to the output apparatus in the order of requests made by a user. If there is a print server performing print processing for a printer specified as the submission destination of a print job, the print server is instructed to execute printing. Consequently, under circumstances where each of plural print servers controls print jobs submitted to printers, print jobs intended for the same printer can be submitted to the printer in the order of requests made by client PCs.

8 Claims, 12 Drawing Sheets

FIG. 7

| JOB-INFORMATION TABLE | | |
|---|---|---|
| JOB-INFORMATION RECORD 1 | ...... | JOB-INFORMATION RECORD N |
| JOB ID | ...... | JOB ID |
| JOB NAME | ...... | JOB NAME |
| PRINTER-IDENTIFICATION INFORMATION | ...... | PRINTER-IDENTIFICATION INFORMATION |
| PRINT SERVER | ...... | PRINT SERVER |
| STATUS | : | STATUS |
| : | : | : |

701 — JOB-INFORMATION TABLE
702a — JOB-INFORMATION RECORD 1
702b — JOB-INFORMATION RECORD N
703 — JOB ID
704 — JOB NAME
705 — PRINTER-IDENTIFICATION INFORMATION
706 — PRINT SERVER
707 — STATUS

FIG. 8

| SYSTEM-INFORMATION TABLE |
|---|
| IP ADDRESS OF BALANCER 1 (VIRTUAL IP ADDRESS) |
| : |
| IP ADDRESS OF BALANCER N (VIRTUAL IP ADDRESS) |
| DATABASE-CONNECTION ACCOUNT |
| DATABASE-CONNECTION PASSWORD |

801 — SYSTEM-INFORMATION TABLE
802a — IP ADDRESS OF BALANCER 1 (VIRTUAL IP ADDRESS)
802b — IP ADDRESS OF BALANCER N (VIRTUAL IP ADDRESS)
803 — DATABASE-CONNECTION ACCOUNT
804 — DATABASE-CONNECTION PASSWORD

FIG. 9

PRINTER-INFORMATION TABLE — 901

| PRINTER 1 | ... | PRINTER N |
|---|---|---|
| PRINTER NAME | ... | PRINTER NAME |
| PRINTER-IDENTIFICATION INFORMATION | ... | PRINTER-IDENTIFICATION INFORMATION |
| STATUS | ... | STATUS |
| DRIVER NAME | ... | DRIVER NAME |
| : | : | : |

PRINT-REQUEST INFORMATION — 1001

| PRINTER NAME | 1002 |
| JOB ID | 1003 |

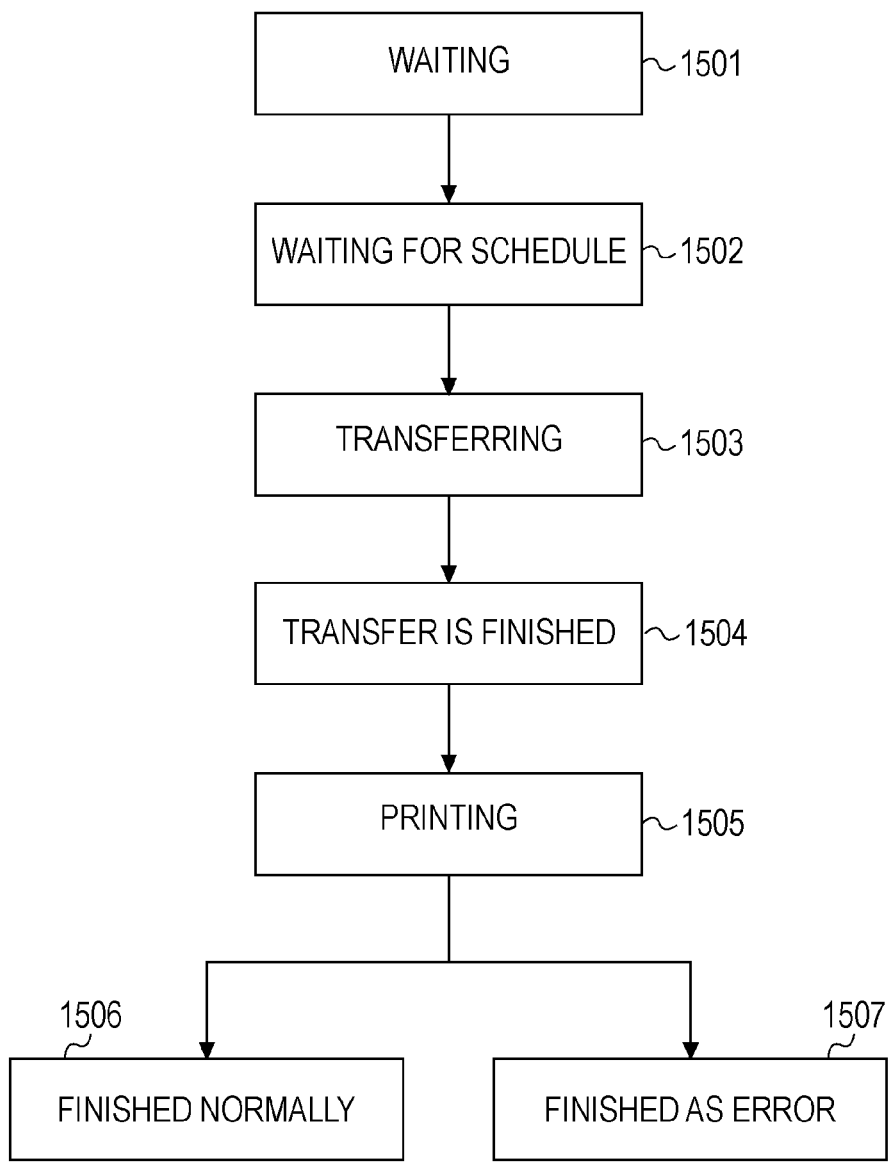

JOB-SUBMISSION-REQUEST APPARATUS AND METHOD FOR MAKING A REQUEST FROM A PLURALITY OF APPARATUSES

BACKGROUND OF THE INVENTION

1. Field of the Invention

The present invention relates to a job-submission-request apparatus and method, more specifically, a job-submission-request apparatus and method suitable for use in making a request of a plurality of job-submission apparatuses to submit a job.

2. Description of the Related Art

Up to this time, print jobs have been distributed among many printers by using a print server. When a single print server controls many print jobs, the load placed on the print server increases, which takes a long time until the sheet discharge of each of the print jobs is achieved. For preventing the above-described problem, a load-balancing environment (an environment created by using, for example, a network-load balancer) which allows for balancing the load placing on the print server by using plural print servers should be created.

The technology disclosed in Japanese Patent Laid-Open No. 2006-313442 is an example of known technologies used for a system configured to control printing in the above-described load-balancing environment. According to the technology disclosed in Japanese Patent Laid-Open No. 2006-313442, plural output servers (print servers) are provided and a management server is provided above the output servers, so as to manage the output servers. Then, the management server transmits data on an output request to the output server. The output server temporarily queues the output request and makes a single printer start a single print process. After the print process is started, the output server retrieves data yet to be printed from the management server and makes the printer execute printing based on the data yet to be printed. According to the known technologies, a load placed on an output server is balanced in the above-described manner and a management server controls the print order so that the print order is ensured.

According to the above-described known technology, however, the plural output servers are managed by the single management server controlling the print order. Therefore, no thought is given to balancing the load placed on the single management server. For printing data on many print jobs by using many printers distant from one another, the load placed on the management server becomes a serious risk. Therefore, achievement of a print system used in a load-balancing environment where plural print servers perform printing control including print-order ensuring so that the load balancing is performed by the entire print system has been demanded.

However, achieving the print system used in the above-described load-balancing environment presents the following problems.

Namely, when plural clients instruct the same printer to perform printing for a print job, it is often difficult to output the print jobs (sheet discharge) in the order in which the print instructions are provided.

For example, an example where a client instructs a printer a to print the first print job and the second print job in that order while a print server A submits a print job to a printer b other than the printer a and makes the printer b perform printing will be considered. In that case, a balancer configured to distribute processing among print servers may operate so that the first print job is assigned to the print server A and the second print job is assigned to the print server B. Consequently, the print server A submits the assigned first print job to the printer a after the print job is submitted to the printer b. Therefore, the second print job is submitted to the printer a before the first print job is submitted thereto. As a result, the sheet discharge (printing) of the second print job is completed before that of the first print job is completed, where the print instruction of the second print job is provided after that of the first print job is provided. As for print jobs intended for the same printer, the print server has to submit the print jobs to the same printer in the order of requests made by the client. Therefore, the above-described example where the print order is not ensured presents a serious problem. Further, it has been difficult to balance a load placed on a print server controlling the print order in addition to printing by using known technologies.

Thus, when a load-balancing environment where each of plural print servers (job-submission apparatuses) configured to submit a job to a printer (an output apparatus) can submit a job to any of plural printers (output apparatuses) is created according to known technologies, the following problem arises. Namely, if a client makes requests of the same printer (output apparatus) to output plural jobs, it may become difficult to submit the jobs to the printer (output apparatus) in the order in which the requests are made by the client.

SUMMARY OF THE INVENTION

Accordingly, if a client makes requests of the same output apparatus to output plural jobs, the present invention allows for submitting the jobs to the output apparatus in the order in which the requests are made by the client in an environment where each of plural job-submission apparatuses can submit a job to any of plural output apparatuses.

An embodiment of the present invention provides a job-submission-request apparatus making a request of any of a plurality of job-submission apparatuses configured to submit a job to an output apparatus to submit a job of which output is demanded by a client. The job-submission-request apparatus includes a determining unit configured to determine whether there is a job-submission apparatus submitting a job to an output apparatus which becomes a submission destination of the job of which output is demanded by the client and a first request unit configured to make a request of the job-submission apparatus submitting the job to the output apparatus which becomes the submission destination of the job of which output is demanded by the client to submit the job of which output is demanded by the client when the determining unit determines that there is the job-submission apparatus submitting the job to the output apparatus which becomes the submission destination of the job of which output is demanded by the client.

Another embodiment of the present invention provides a job-submission apparatus including an accepting unit configured to accept a request for submission of a job, the request being transmitted from the above-described job-submission-request apparatus, a submission unit configured to submit the job for which the submission request is accepted by the accepting unit to an output apparatus which is a submission destination of the job, and a registration-instruction unit configured to instruct to register data on progress of the submitted job performed by the submission unit with a database, wherein the registration-instruction unit updates submission-progress data registered with the database according to progress of the submission performed by the submission unit.

In yet another embodiment of the present invention, a job-submission system including the above-described job-submission-request apparatus, the above-described job-submission apparatus, and a database with which information about a job-submission apparatus performing submission of a job and information about an output apparatus which becomes a submission destination of the job are registered in association with each other.

Additionally, an embodiment of the present invention also provides a job-submission-request method provided to make a request of any of a plurality of job-submission apparatuses configured to submit a job to an output apparatus to submit a job of which output is demanded by a client, the job-submission-request method including determining whether there is a job-submission apparatus submitting a job to an output apparatus which becomes a submission destination of the job of which output is demanded by the client, and making a request of the job-submission apparatus submitting the job to the output apparatus which becomes the submission destination of the job of which output is demanded by the client to submit the job of which output is demanded by the client when it is determined, at the determining step, that there is the job-submission apparatus submitting the job to the output apparatus which becomes the submission destination of the job of which output is demanded by the client.

If there is a job-submission apparatus performing job-submission processing for an output apparatus which becomes the submission destination of a job of which output is demanded by a client, an embodiment of the present invention allows for making a request of the job-submission apparatus to submit the job of which output is demanded by the client. Therefore, it becomes possible to ensure the order in which jobs are submitted to the same output apparatus even though plural job-submission apparatuses are operated.

Further features of the present invention will become apparent from the following description of exemplary embodiments with reference to the attached drawings.

BRIEF DESCRIPTION OF THE DRAWINGS

FIG. 7 shows an example of the configuration of a job-information table in which print-job information is written according to the above-described embodiment.

FIG. 8 shows an example of the configuration of a system-information table in which information about the entire distribution-print system is written according to the above-described embodiment.

FIG. 9 shows an example of the configuration of a printer-information table in which printer information is written according to the above-described embodiment.

FIG. 10 shows an example of print-request information according to the above-described embodiment.

FIG. 15 exemplarily shows how the status of a print job is changed, where data on the status is updated by the print server according to the above-described embodiment.

DESCRIPTION OF THE EMBODIMENTS

An embodiment of the present invention will be described with reference to the attached drawings.

Figure 1:
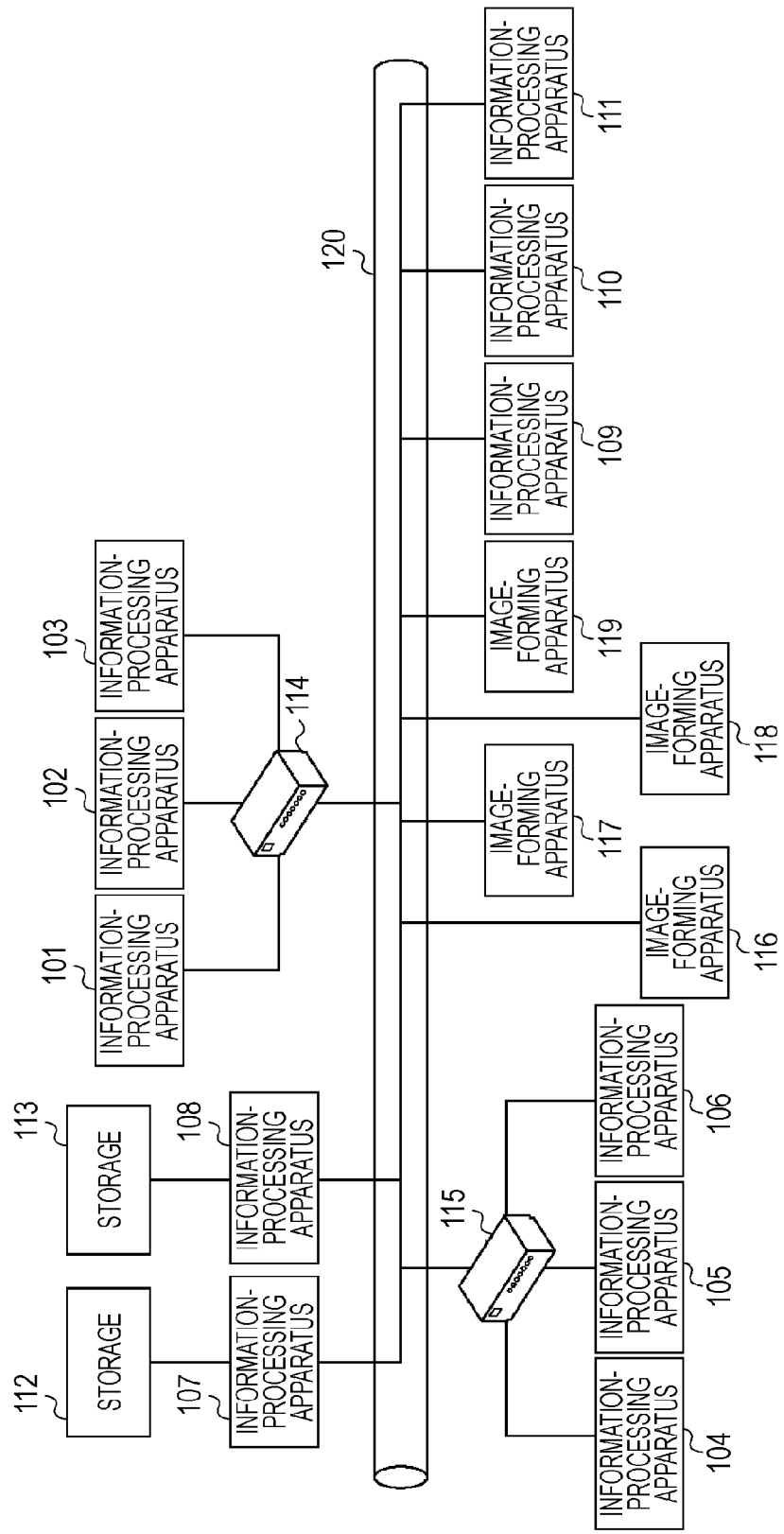
FIG. 1 is a block diagram showing an example of the network configuration of a distribution-print system according to an embodiment of the present invention.

FIG. 1 is a block diagram showing an example of the network configuration of a distribution-print system (a job-submission system) according to the above-described embodiment.

In FIG. 1, the distribution-print system includes information-processing apparatuses 101, 102, 103, 104, 105, 106, 107, 108, 109, 110, and 111, image-forming apparatuses 116, 117, 118, and 119 including printers (printing apparatuses), etc. The distribution-print system further includes storage devices 112 and 113 such as external hard-disk drives (HDDs), and network-load balancers (hereinafter referred to as balancers) 114 and 115. The above-described apparatuses and devices are connected to one another via a network 120.

Each of the information-processing apparatuses 101 to 111 includes a computer, so as to make a request for printing data on a print job, submit a print job, display an image of the printing state, and monitor the image-forming apparatuses 116 to 119, for example. Further, a program provided to perform printing control or the like is stored in each of the information-processing apparatuses 101 to 111 in an executable manner. Further, the print-job data, print-setting information, information about the print job, etc. are stored in the storage devices 112 and 113.

Specifically, each of the information-processing apparatuses 109 to 111 is a client personal computer (PC) configured to make a request for printing (outputting) the print job, for example. The information-processing apparatuses 101 to 103 are managed by the information-processing apparatuses 107 and 108, and configured to present information about the print job on which data is stored in the storage devices 112 and 113 via a Web browser. The information-processing apparatuses 109 to 111 (the client PCs) issue requests to print data on desired print jobs to the information-processing apparatuses 101 to 103 (the Web-application servers) via a Web browser. Consequently, the information-processing apparatuses 104 to 106 acquire the print-job data from the information-processing apparatuses 107 and 108. Then, the information-processing apparatuses 104 to 106 submit the acquired print jobs to the image-forming apparatuses 116 to 119.

Further, the information-processing apparatuses 104 to 106 acquire information about the state of the print job from the image-forming apparatuses 116 to 119 and record the state information in the storage devices 112 and 113. The image-forming apparatuses 116 to 119 are print devices provided, as physical apparatuses configured to receive the print jobs including print data from the information-processing apparatuses 104 to 106, and analyze and print the received print jobs. The image-forming apparatuses 116 to 119 may be printers using any system, such as laser-beam printers using an electrophotographic system, ink-jet printers using an ink-jet system, printers using a thermal-transfer system, etc.

Here, communications performed between apparatuses and/or devices included in the distribution-print system may be wired communications performed by using an Ethernet (registered trademark) cable or the like and/or wireless communications performed by using radio waves, light, etc.

Figure 2:
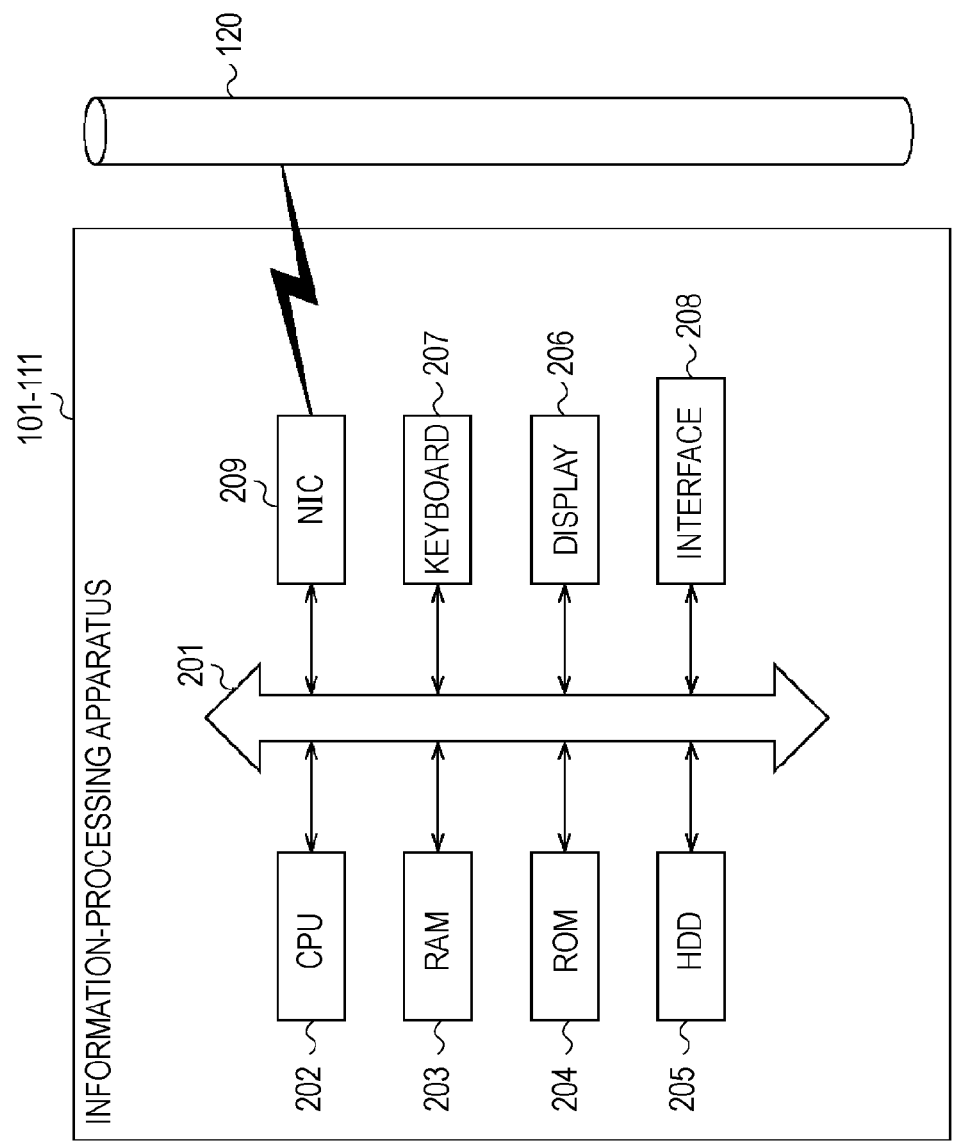
FIG. 2 shows an example of the hardware configuration of an information-processing apparatus according to the above-described embodiment.

FIG. 2 shows an example of the hardware configuration of each of the information-processing apparatuses 101 to 111 of the distribution-print system according to the above-described embodiment of the present invention.

In FIG. 2, a CPU 202 controls the entire information-processing apparatus. The CPU 202 executes an application program, an operating system (OS), etc. that are stored in a hard-disk drive (HDD) 205, and performs control, so as to temporarily store information required to execute the program, file data, etc. in a random-access memory (RAM) 203.

A read-only memory (ROM) 204 stores, for example, programs including a basic input-and-output (I/O) program, etc. and/or various types of data including font data and template data that are used to perform document processing, for example. The RAM 203 functions, as a main memory, a work area, etc. of the CPU 202.

The HDD 205 functions, as a large-capacity memory. The HDD 205 stores, for example, at least one of an application program, a web-server program, a database program, a printer-driver program, an OS, a network-printer-control program, a related program, etc.

A display 206 is provided to display a command on which data is transmitted from a keyboard 207, the state of each of the image-forming apparatuses 116 to 119 (e.g., printers), etc.

An interface 208 is an interface provided between the information apparatus and an external apparatus. The interface 208 is used so that, for example, a printer, a universal-serial-bus (USB) device, a peripheral device, and the information-processing apparatus are connected to one another.

A keyboard 207 is used to input data on an instruction issued by a user. Here, the information-processing apparatus includes a mouse or the like in addition to the keyboard 207, as a unit used to input data on an instruction issued by the user.

A system bus 201 is provided to manage the flow of data in the information-processing apparatus of the distribution-print system.

A network-interface card (NIC) 209 is provided as an example communication unit, so as to transmit and/or receive data to and/or from the external apparatus via the network 120.

Incidentally, FIG. 2 shows an example of the configuration of the information-processing apparatus and the configuration is not limited to that shown in FIG. 2. For example, the storage destination of the data and/or the program may be any storage medium including the ROM 204, the RAM 203, the HDD 205, etc. according to the features of the data and/or the program. The storage destination can be changed, as required.

Figure 3:
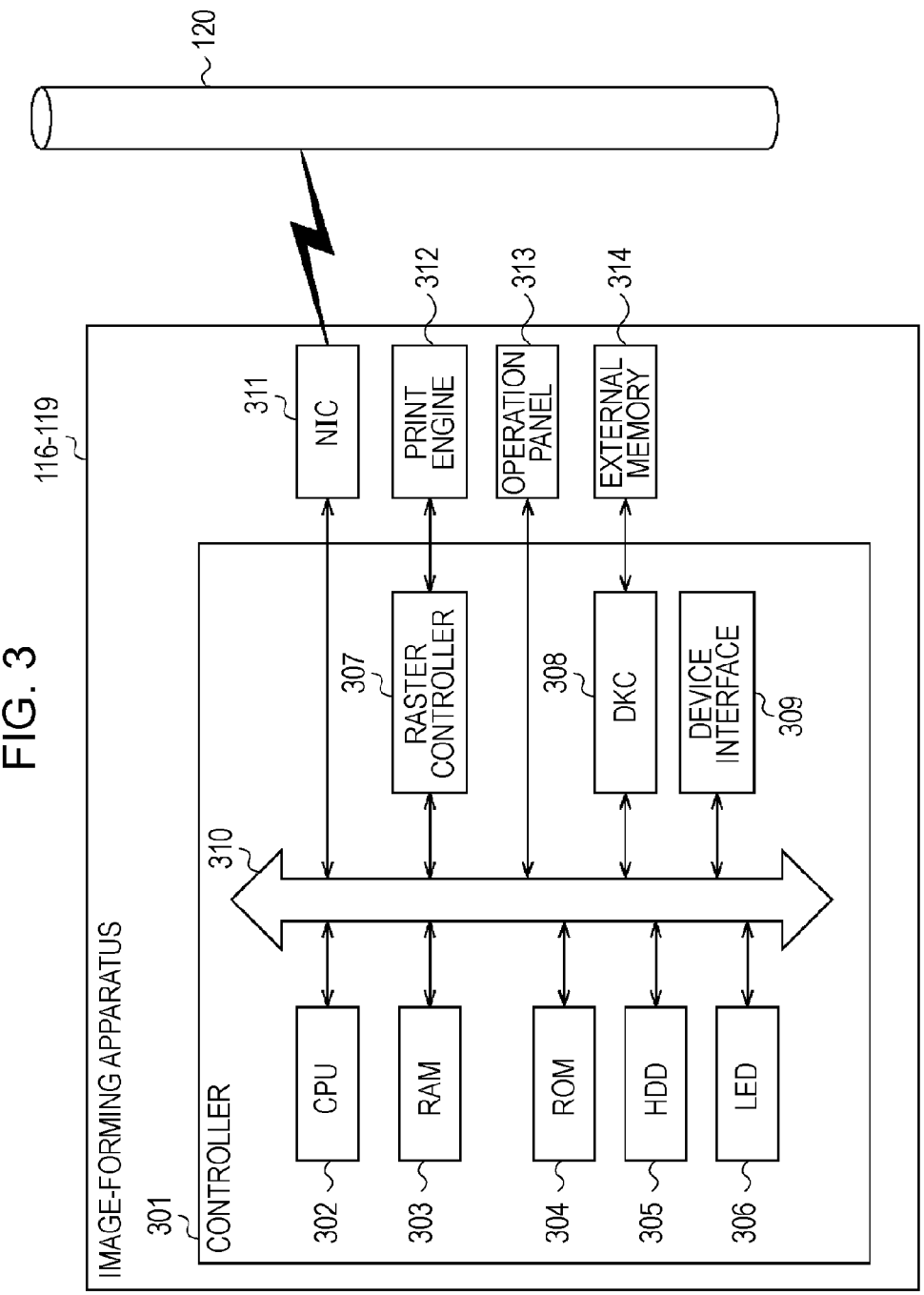
FIG. 3 shows an example of the hardware configuration of an image-forming apparatus according to the above-described embodiment.

FIG. 3 shows an example of the hardware configuration of each of the image-forming apparatuses 116 to 119 of the distribution-print system of the above-described embodiment.

A controller 301 is a device managing a control system of the image-forming apparatus. The controller 301 includes a CPU 302, a RAM 303, a ROM 304, an HDD 305, a light-emitting diode (LED) 305, a raster controller 307, a disk controller (DKC) 308, and a device interface 309.

The CPU 302 controls the entire image-forming apparatus. The CPU 302 has control over accesses made by various devices connected to a system bus 310 based on a control program stored in the ROM 304, a control program stored in an external memory 314 via the DKC 308, resource data, etc.

The RAM 303 functions as a main memory, a work area, etc. of the CPU 302. The memory capacity of the RAM 303 can be expanded through an option RAM connected to an extension port (not shown).

The HDD 305 functions as a large-capacity memory and stores, for example, a job-automatic-printing program, a printing-control program, a submitted print job, a related program, etc. The raster controller 307 is a controller configured to convert print data generated based on a page-description language (PDL) into image data. The DKC 308 controls a storage operation performed by the external memory 314. The device interface 309 is provided between the image-forming apparatus and an external device that can be connected to the image-forming apparatus through a USB, etc.

An operation panel 313 (an operation unit) includes buttons provided to allow the user to perform operations including setting operation mode, etc. of the image-forming apparatus, copy specification, and so forth. The operation panel 313 further includes a liquid-crystal panel provided to display information about the operation state, etc. of the image-forming apparatus. Here, the operation panel 313 may include a touch panel. The LED 306 illuminates and/or goes out according to the operation state, etc. of the image-forming apparatus.

A network-interface card (NIC) 311 is an interface provided between the image-forming apparatus and external devices and/or apparatuses. The image-forming apparatus transmits and/or receives data to and/or from the external devices and/or apparatuses via the NIC 311. A print engine 312 is configured to print an image on a sheet by using known printing technologies. An appropriate embodiment of the print engine 312 may be, for example, a print engine using an electrophotographic system (a laser-beam system), an ink-jet system, a sublimation (thermal transfer) system, etc.

Figure 4:
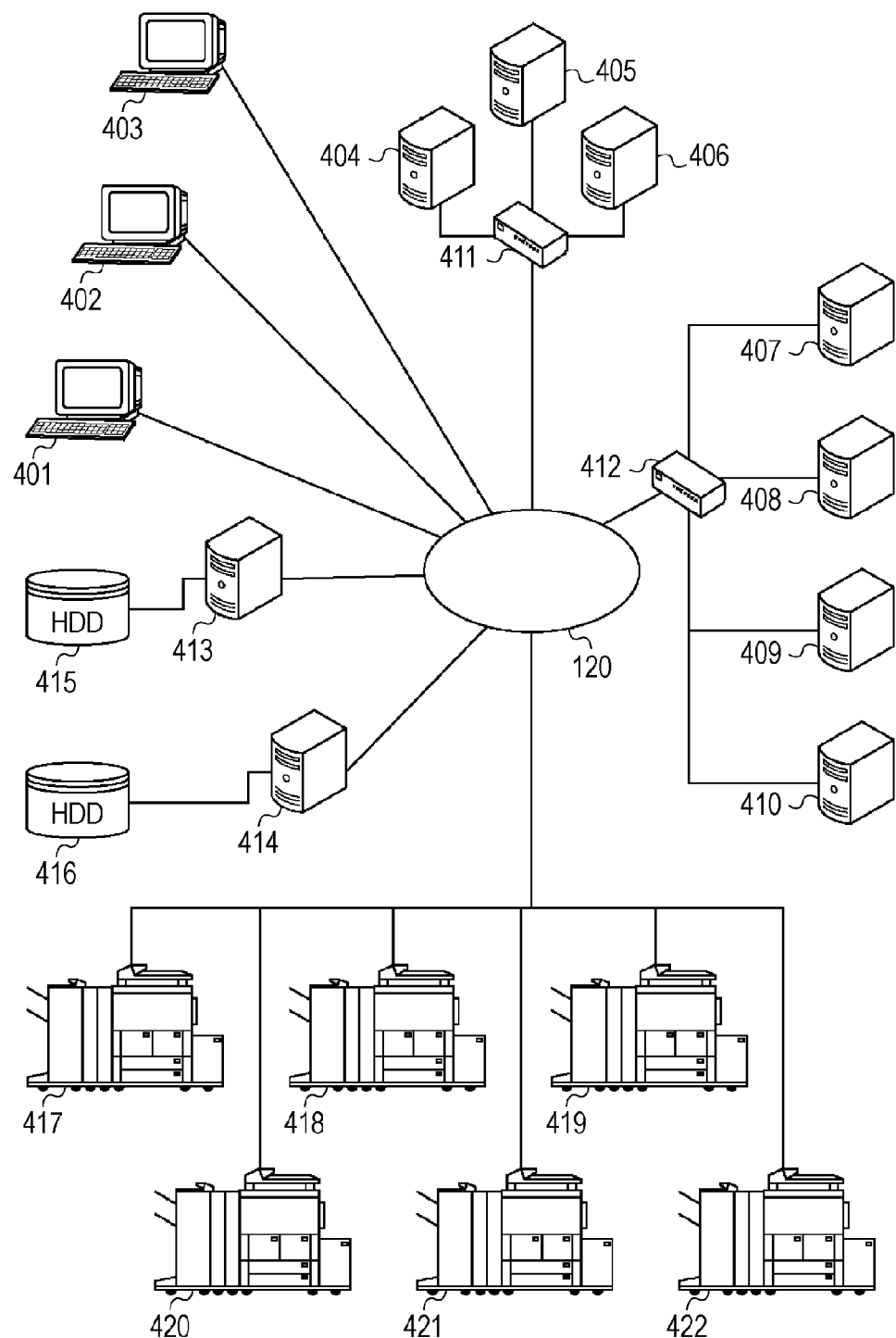
FIG. 4 specifically shows an example of the system configuration of the distribution-print system according to the above-described embodiment.

FIG. 4 specifically shows an example of the system configuration of the distribution-print system of the above-described embodiment.

Client PCs 401, 402, and 403 correspond to the information-processing apparatuses 109 to 111 shown in FIG. 1. Each of the client PCs 401 to 403 stores a Web-browser program therein. The client PCs 401 to 403 issue requests for a Web page to Web-application servers 404, 405, and 406. Consequently, an image of the Web page is displayed on the display 206 of each of the client PCs 401 to 403. On the Web page, it becomes possible to display and select print-job information, select a printer used to output a selected print job, set print information, make a request for printing, change the priority of a print job which is being printed, stop printing, issue an instruction to delete stored data on a print job, etc. Here, the Web-application servers 404 to 406 correspond to the information-processing apparatuses 101 to 103 shown in FIG. 1.

Figure 6:
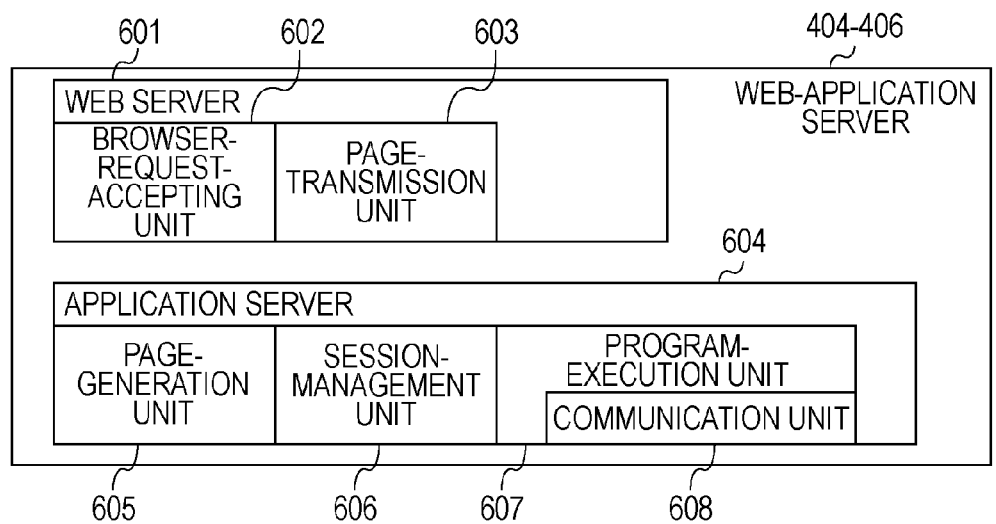
FIG. 6 shows an example of the functional configuration of a Web-application server according to the above-described embodiment.

Each of the Web-application servers 404 to 406 performs processing specified through the Web browser of each of the client PCs 401 to 403. More specifically, each of the Web-application servers 404 to 406 (a Web server 601 which is shown in FIG. 6 and will be described later) receives a request specified through the Web browser and performs the processing corresponding to the request. The request specified through the Web browser is transmitted to each of the Web-application servers 404 to 406 via a balancer 411. At that time, the balancer 411 connects with the Web-application servers 404 to 406 by using several types of balancing systems including, for example, a round-robin system, a least-connection system, etc. Here, the balancer 411 corresponds to the balancer 114 shown in FIG. 1.

When displaying print-job information (refer to FIG. 7), each of the Web-application servers 404 to 406 acquires the print-job information from the HDD 415 via a database server 413.

At that time, each of the Web-application servers 404 to 406 acquires print-job information that can be referred to by a user who logs in to the Web-application servers 404 to 406 from the database server 413. Here, the database server 413 corresponds to the information-processing apparatus 107 shown in FIG. 1 and the HDD 415 corresponds to the storage device 112 shown in FIG. 1.

In the distribution-print system shown in FIG. 4, information about printers 417, 418, 419, 420, 421, and 422, (shown in FIG. 9 and hereinafter referred to as printer information, as required) is also stored in the HDD 415. Each of the Web-application servers 404 to 406 can acquire the printer information from the HDD 415 via the database server 413.

Candidates for a printer which is the print destination are displayed through the Web browser of each of the client PCs 401 to 403. When the user refers to the Web browser and specifies the printer which is the print destination, the Web-application servers 404 to 406 transmit requests for printing to the print servers 407 to 410. Incidentally, the print servers 407 to 410 correspond to the information-processing apparatuses 104 to 106 shown in FIG. 1, and the printers 417 to 422 correspond to the image-forming apparatuses 116 to 119 shown in FIG. 1.

The print servers 407 to 410 acquire information about the specified printers 417 to 422 (refer to FIG. 9) and the print-job information (refer to FIG. 7) from the database server 413. Further, each of the print servers 407 to 410 acquires data on a specified print job from the HDD 416 via a job-data-storage server 414. The Web-application servers 404 to 406 make requests of the print servers 407 to 410 to perform printing via the balancer 115 shown in FIG. 1. At that time, the balancer 412 connects with the print servers 407 to 410 by using several types of balancing methods (e.g., the round-robin system, the least-connection system, etc.).

Here, the print servers 407 to 410 correspond to the information-processing apparatuses 104 to 106 shown in FIG. 1, the job-data-storage server 414 corresponds to the information-processing apparatus 108 shown in FIG. 1, and the HDD 416 corresponds to the storage device 113 shown in FIG. 1. Further, the balancer 412 corresponds to the balancer 115 shown in FIG. 1. Each of the print servers 407 to 410 submits an acquired print job to a specified printer. During the above-described submission processing, the print servers 407 to 410 monitor the printers 417 to 422.

Figure 5:
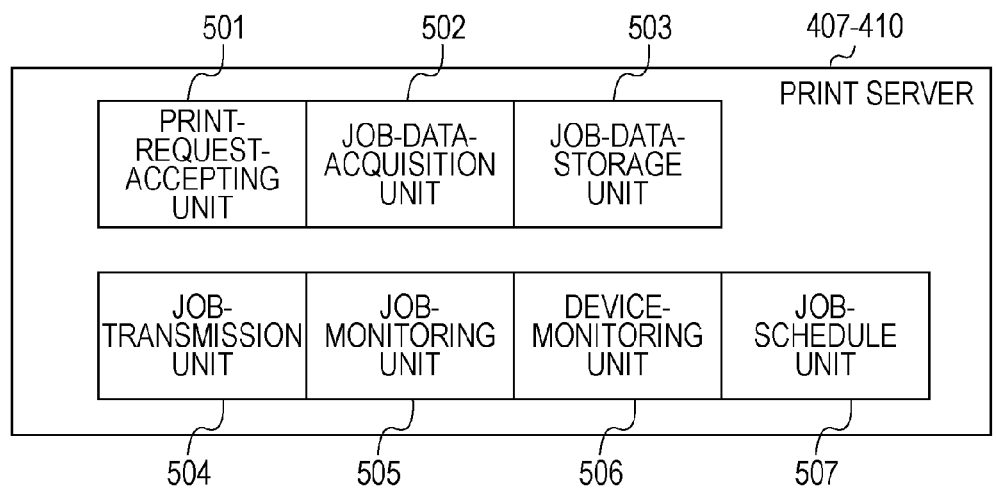
FIG. 5 shows an example of the functional configuration of a print server according to the above-described embodiment.

FIG. 5 shows an example of the functional configuration of each of the print servers 407 to 410. In FIG. 5, a print-request-accepting unit 501 accepts a print request (a request to submit a job) transmitted from each of the Web-application servers 404 to 406. Upon accepting the print request, a job-data-acquisition unit 502 acquires the print-job information (refer to FIG. 7) corresponding to a print job specified by the print request from the HDD 415 via the database server 413. Further, the job-data-acquisition unit 502 acquires data on the print job specified by the print request from the HDD 416 via the job-data-storage server 414. A job-data-storage unit 503 stores data of the print job. A job-transmission unit 504 transmits the print-job data to a printer specified through the print request so that the print job is submitted to the printer.

Further, a job-scheduling unit 507 manages the schedules of print jobs and a job-monitoring unit 505 monitors a print job currently subjected to print processing. When the print processing is performed, the job-monitoring unit 505 accesses the HDD 415 via the database server 413, and updates the status of a job-information table (refer to FIG. 7) in which the print-job information is written. When each of the print servers 407 to 410 is being activated, the state of each of the printers 417 to 422 is monitored by a device-monitoring unit 506, as required.

Thus, in the above-described embodiment, a job-submission system is achieved by the print servers 407 to 410.

FIG. 6 shows an example of the functional configuration of each of the Web-application servers 404 to 406. Each of the Web-application servers 404 to 406 includes a Web server 601 configured to accept a request (a job-output request) transmitted from each of the client PCs 401 to 403 (Web browsers). Further, each of the Web-application servers 404 to 406 includes an application server 604 configured to actually perform processing for the transmitted request.

The Web server 601 includes a browser-request-accepting unit 602 and a page-transmission unit 603. On the other hand, the application server 604 includes a page-generation unit 605, a session-management unit 606, and a program-execution unit 607.

The browser-request-accepting unit 602 accepts a request transmitted from the Web browser. The page-generation unit 605 generates a Web page functioning as a response to the request. The page-transmission unit 603 transmits data on the Web page generated by the page-generation unit 605 to the Web browser. The session-management unit 606 manages a session on which data is transmitted from the Web browser, and stores information about the session.

The program-execution unit 607 includes a communication unit 608. The program-execution unit 607 makes a request of the database server 413 to acquire print-job information desired by the user by using the communication unit 608, transmits a print request (a request to submit a job) to the print servers 407 to 410, etc. At that time, the communication unit 608 communicates with the database server 413 and the print servers 407 to 410 by using a specified communication protocol. Thus, in the above-described embodiment, a job-submission-request system is achieved by the Web-application servers 404 to 406.

FIG. 7 shows an example of the configuration of a job-information table 701 in which the print-job information is written. Data on the above-described job-information table 701 is stored in the HDD 415 managed by the database server 413.

In FIG. 7, the job-information table 701 is a table retaining the print-job information. A job-information record 702 including plural job-information records 702a and 702b is registered with the job-information table 701. The job-information record 702 includes job-identification (ID) data 703, job-name data 704, printer-identification information 705, print-server data 706, and status data 707. Details on the above-described data and information that are registered with the job-information record 702 will be described as below.

The job-ID data 703 is used to uniquely identify a print job and provided as a unique ID used in the distribution-print system. The job-name data 704 indicates the name of the print job. The printer-identification information 705 is used to identify a printer which performs printing. The printer which performs the printing is specified by the user for the Web browser. Each of the print servers 407 to 410 submits a print job to the specified printer. Then, each of the print servers 407 to 410 monitors the submitted print job. Further, the print servers 407 to 410 monitor the printers 417 to 422.

The printer-identification information includes, for example, data on the IP address, the host name, etc. of each of the printers 417 to 422.

The status data 707 is status information indicating the state of the print job, where the state is shown as, for example, "waiting", "waiting for schedule", "transferring", "transfer is finished", "printing", "finished normally", "finished as error", etc. The value of the status data 707 is updated according to the state of the print job based on an instruction transmitted from each of the print servers 407 to 410 monitoring the print job.

The above-described print-job information can be transmitted from the database server 413 to each of the Web-application servers 404 to 406 and referred to through the Web browser. Thus, in the above-described embodiment, the printer-identification information 705 achieves information about an output destination which becomes the submission destination of a job. Further, the print-server data 706 achieves information about the job-submission apparatus performing the job submission. Further, the status data 707 shows the progress of the job submission. Then, the printer-identification information 705, the printer-server data 706, and the status data 707 are associated with one another and registered with the job-information table 701 (the HDD 415).

FIG. 8 shows an example of the configuration of a system-information table 801 in which information about the entire distribution-print system is written. The system-information table is held by the HDD 415 managed by the database server 413.

In FIG. 8, the IP address (virtual IP address)-of-a balancer 1 802*a*, the IP address (virtual IP address)-of-a balancer N 802*b*, a database-connection account 803, and a database-connection password 804 are included in the system-information table 801. Here, the number of the IP addresses (virtual IP addresses)-of-balancers 802*a* and 802*b* becomes the same as that of balancers provided in the distribution-print system.

When making requests of the print servers 407 to 410 to perform printing, each of the Web-application servers 404 to 406 usually connects with the IP address (virtual IP address) 802 corresponding to the balancer 412 shown in FIG. 4. The balancer 412 determines one of the print servers 407 to 410 to be a print server for connection by using several types of balancing methods and connects with the determined print server. The several types of balancing methods may be, for example, the round-robin system, a weighted-round-robin system, a quickest response time/minimum-server-load system, the least-connection system, etc.

The round-robin system is usually known as a system configured to evenly distribute traffic among the servers. The weighted round-robin system is usually known as a system which allows for giving a priority to each of the servers and changing the amount of the traffic distributed among the servers based on the priorities. The quickest response time/ minimum-server-load system is usually known as a system provided to distribute traffic based on the operation state of each of the servers, that is, a server which sends back the quickest response, a server under the lightest load, etc.

The least-connection system is usually known as a system provided to manage the connection state as a table while distributing traffic among servers, extract data on a server to which the smallest number of connections are made from the information shown on the table, and distribute the traffic. Thus, in the above-described embodiment, the balancer 412 achieves a load-balancing device performing load balancing among the print servers 407 to 410.

The database-connection account 803 and the database-connection password 804 are used as log-in-authentication information used when the Web-application servers 404 to 406 and/or the print servers 407 to 410 log in to the database server 413. The value of each of the database-connection account 803 and the database-connection password 804 is encoded and held on the database.

FIG. 9 shows an example of the configuration of a printer-information table 901 in which printer information is written. Data on the above-described printer-information table 901 is stored in the HDD 415 managed by the database server 413.

In FIG. 9, the printer-information table 901 retains information about each of the plural printers 417 to 422. A record of the information about each of the printers 417 to 422 includes, for example, printer-name data 902, printer-identification information 903, status data 904, driver-name data 905, etc.

The printer-name data 902 indicates the name of each of the printers 417 to 422 provided in the distribution-print system. Further, the printer-identification information 903 includes data on the IP address and/or the host name, etc. of each of the printers 417 to 422, so as to identify the printers 417 to 422 on the network 120.

The status data 904 is information (a value) indicating the state of each of the printers 417 to 422. When the device-monitoring unit 506 of each of the print servers 407 to 410 detects the state of the printers 417 to 422, the value of the status data 904 is updated to a value indicating the detected state. The driver-name data 905 denotes the name of a driver used by each of the print servers 407 to 410 at the printing time.

FIG. 10 shows an example of print-request information which is sent from the client PCs 401 to 403 (the Web browsers) to the Web-application servers 404 to 406, so as to instruct the Web-application servers 404 to 406 to perform printing. The print-request information is also sent from the Web-application servers 404 to 406 to the print servers 407 to 410, so as to make a request of the print servers 407 to 410 to perform printing.

In FIG. 10, print-request information 1001 includes printer-name data 1002 and job-ID data 1003. The printer-name data 1002 is information agreeing with the printer-name data 902 shown on the printer-information table 901 shown in FIG. 9. Each of the Web-application servers 404 to 406 specifies the printer-identification information 903 based on the printer-name data 1002. The job-ID data 1003 is information agreeing with the job-ID data 703 shown on the job-information table 701 shown in FIG. 7. The job-ID data 1003 is an ID used to uniquely identify a print job and provided as a unique ID used in the distribution-print system.

Figure 11:
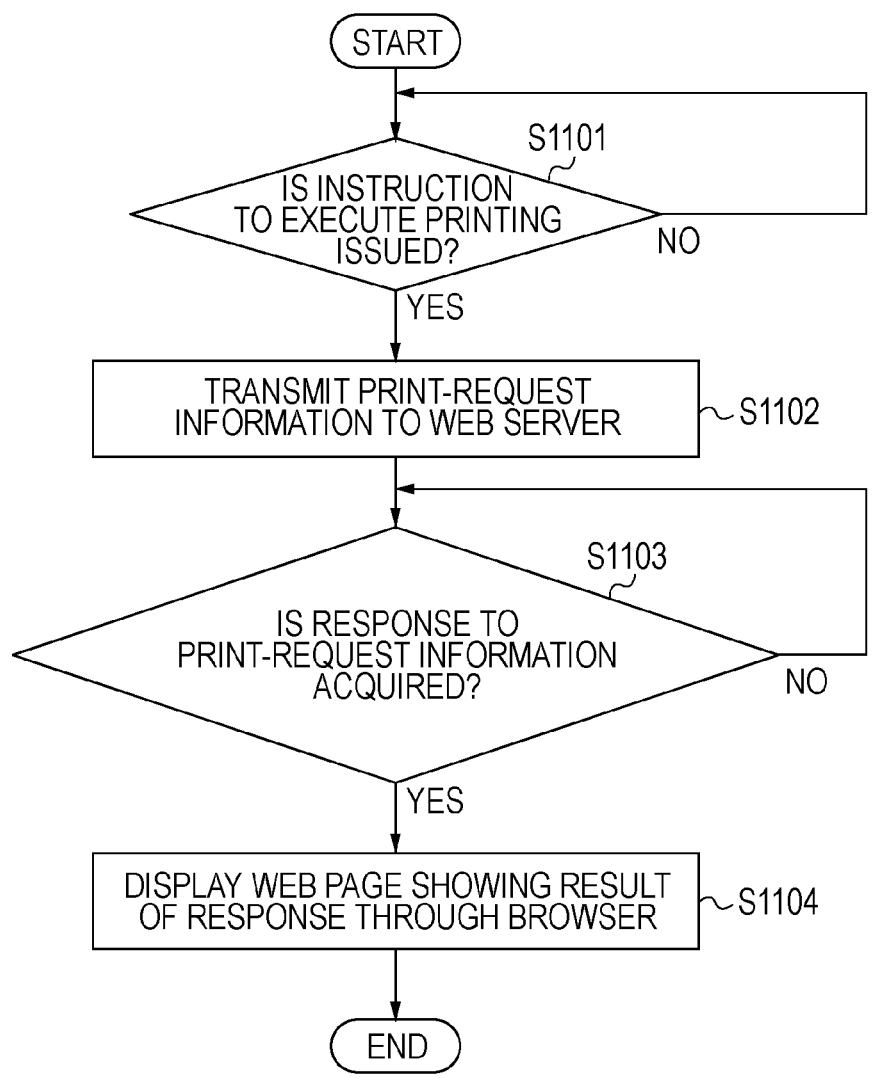
FIG. 11 is a flowchart illustrating example processing procedures performed in the distribution-print system when client PCs (Web browsers) make requests of Web-application servers to perform printing via a balancer according to the above-described embodiment.

FIG. 11 is a flowchart illustrating example processing procedures performed in the distribution-print system when the client PCs (Web browsers) 401 to 403 instruct the Web-application servers 404 to 406 to perform printing via the balancer 411.

Further, at step S1101, the client PC waits until a "print execution" button is pressed on a print-execution page of a Web page. That is to say, the client PC waits until the client PC receives an instruction to execute printing.

Upon receiving the print-execution instruction, the processing advances to step S1102, and the client PC transmits the print-request information 1001 to the Web-application server. As shown in FIG. 10, the print-request information 1001 includes the printer-name data 1002 and the job-ID data 1003.

Next, at step S1103, the client PC waits until information about the result of a response to the print-request information 1001 transmitted at step S1102 is acquired, the response being transmitted from the Web-application server. Upon acquiring the result of the response to the print-request information 1001, the processing advances to step S1104 so that the client PC displays a Web page showing the response result through the Web browser.

Figure 12:
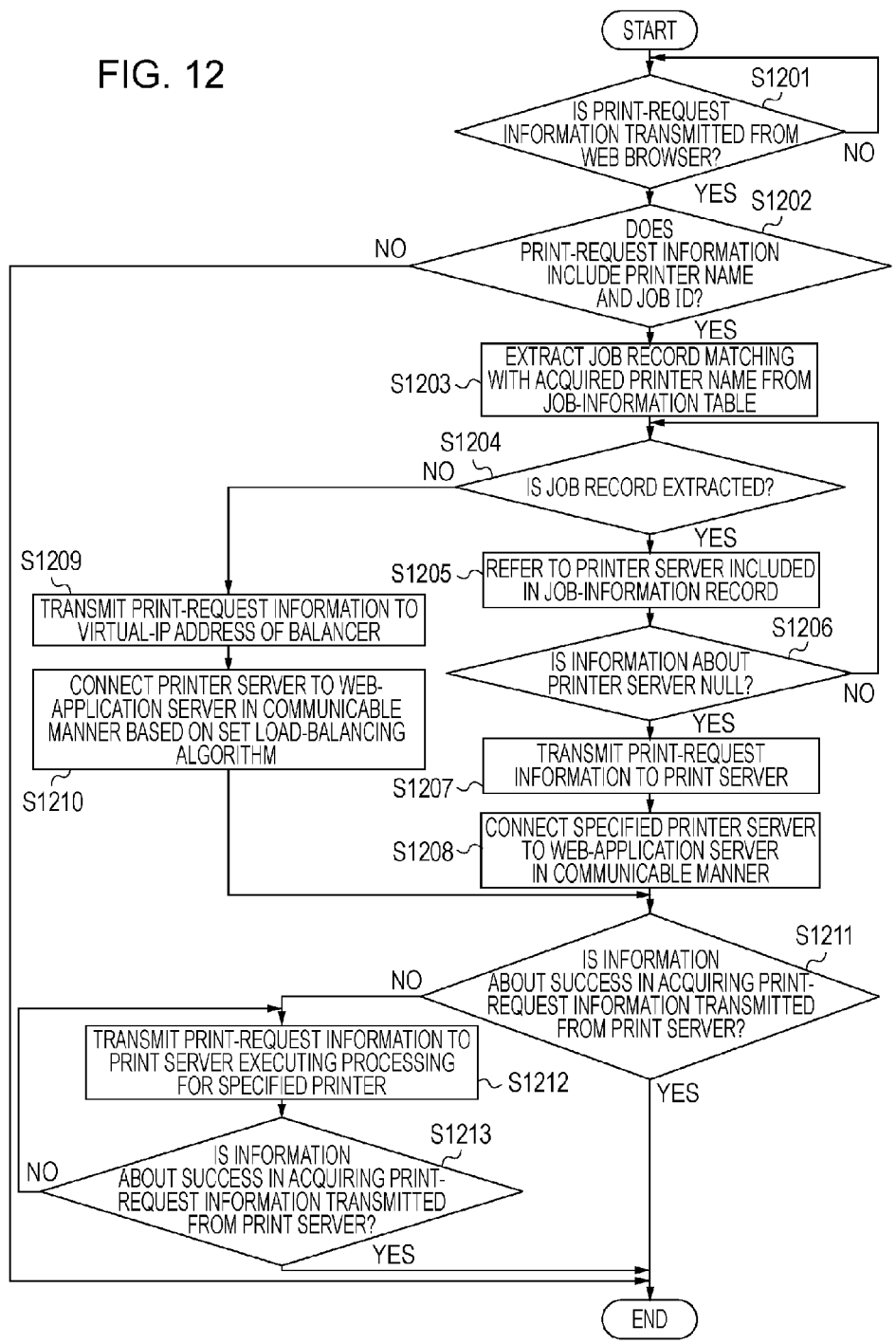
FIG. 12 is a flowchart showing example processing procedures performed in the distribution-print system when the Web-application server makes a request of the print server to perform printing according to the above-described embodiment.

FIG. 12 is a flowchart showing example processing procedures performed in the distribution-print system when the Web-application server makes a request of the print server to perform printing. At step S1201, the Web-application server waits until the print-request information 1001 is transmitted from the Web browser of the client PC.

Upon receiving the print-request information 1001, the processing advances to step S1202. Then, the Web-application server determines whether the print-request information 1001 transmitted at step S1201 includes both the printer-name data 1002 and the job-ID data 1003. If the result of the determination shows that the print-request information 1001 does not include at least one of the printer-name data 1002 and the job-ID data 1003, the processing procedures shown in the flowchart of FIG. 12 are finished.

On the other hand, if the print-request information 1001 includes both the printer-name data 1002 and the job-ID data 1003, the processing advances to step S1203. Then, the Web-application server makes a request of the database server 413 to acquire the printer-identification information 903 corresponding to the printer-name data 1002 included in the transmitted print-request information 1001. The database server 413 refers to the print-information table 901 on which data is stored in the HDD 415, and extracts the printer-identification information 903 from the record of the printer-name data 902 agreeing with the printer-name data 1002. Then, the database server 413 transmits the extracted printer-identification information 903 to the Web-application servers 404 to 406, as a response to the request.

The Web-application server which receives the printer-identification information 903 makes a request of the database server 413 to acquire the print-job information corresponding to the printer-identification information 903. The database server 413 refers to the job-information table 701 on which data is stored in the HDD 415, and extracts the job-information record 702 therefrom, where the printer-identification information 705 agreeing with the printer-identification information 903 belongs to the job-information record 702. Then, the database server 413 transmits the extracted job-information record 702 to the Web-application servers 404 to 406, as a response to the request. Here, if the job-information table 701 does not include the job-information record 702 to which the printer-identification information 705 agreeing with the printer-identification information 903 belongs, the database server 413 transmits information indicating that the job-information table 701 does not include the job-information record 702 to the Web-application servers 404 to 406, as a response to the request.

Although the Web-application servers make two requests in the above-described embodiment, the Web-application servers may make a single request. In that case, the database server 413 extracts the job-information record 702 from the job-information table 701 based on the printer-identification information 903 extracted from the printer-information table 901.

Next, at step S1204, the Web-application server determines whether the job-information record 702 is extracted. If the determination result shows that the job-information record 702 is not extracted, the processing advances to step S1209 which will be described later.

On the other hand, if the job-information record 702 is extracted, the processing advances to step S1205. Then, the Web-application server refers to the print-server data 706 included in the extracted job-information record 702.

Thus, in the above-described embodiment, a search unit is achieved through processing procedures performed at steps S1203, S1204, and S1205.

Next, at step S1206, the Web-application server determines whether the value of the print-server data 706 which is referred to is null. If the determination result shows that the value of the print-server data 706 which is referred to is null, the processing returns to step S1204.

On the other hand, if the value of the print-server data 706 which is referred to is not null, the processing advances to step S1207. Then, the Web-application server establishes a communication connection with a print server specified based on the print-server data 706 which is referred to, and transmits the print-request information 1001 to the print server.

Thus, in the above-described embodiment, a determining unit is achieved through a processing procedure performed at step S1206, and a request unit is achieved through a processing procedure performed at step S1207. Next, at step S1208, the balancer 412 connects the Web-application server which had transmitted the print-request information 1001 to the specified print server in a communicable manner so that communications can be performed between the Web-application server and the print server. Then, the processing advances to step S1211.

If it is determined that the job-information record 702 is not extracted at step S1204, the processing advances to step S1209. Then, the Web-application server makes a request of the database server 413 to acquire data on the IP address of the balancer 412. The database server 413 refers to the system-information table 801 on which data is stored in the HDD 415, and extracts data on the IP address 802, the data indicating the IP address of the balancer 412. Then, the database server 413 transmits the extracted data on the IP address 802 of the balancer 412 to the Web-application server, as a response to the request. Upon receiving the data on the IP address 802 of the balancer 412, each of the Web-application servers 404 to 406 transmits the print-request information 1001 to the IP address 802 of the balancer 412.

Thus, in the above-described embodiment, the second request unit is achieved through the processing procedure performed at step S1209.

Next, at step S1210, the balancer 412 connects a print server determined based on several types of balancing systems (e.g., the round-robin system, the least-connection system, etc.) to the Web-application servers 404 to 406 in a communicable manner. Then, the processing advances to step S1211.

When the processing advances to step S1211, the Web-application server determines whether information indicating that the print-request information 1001 had been successfully accepted is transmitted from the print server. If the determination result shows that the above-described information is transmitted, the processing procedures shown in the flowchart of FIG. 12 are finished.

On the other hand, if the information indicating that the print-request information 1001 had been successfully accepted is not transmitted, the processing advances to step S1212. Then, the print server sends an error notification and information about a print server currently executing print processing for a specified printer to the Web-application server. The Web-application server retransmits the print-request information 1001 to the print server corresponding to the print-server information transmitted from the print server.

Next, at step S1213, each of the Web-application servers 404 to 406 determines whether the information indicating that the print-request information 1001 had been successfully accepted is transmitted from the print server. If the determination result shows that the above-described information is transmitted, the processing procedures shown in the flowchart of FIG. 12 are finished.

On the other hand, if the information indicating that the print-request information 1001 had been successfully accepted is not transmitted, the processing returns to step S1212.

Figure 13:
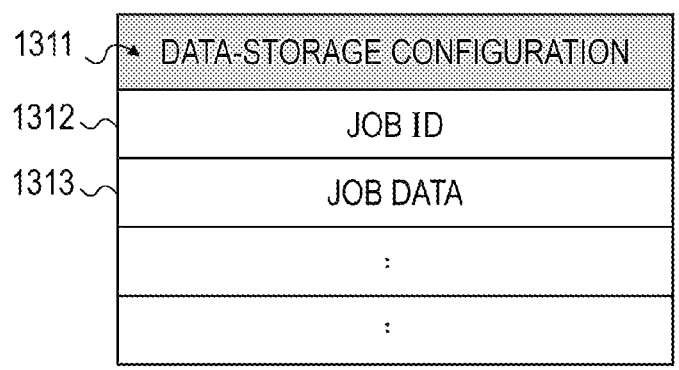
FIG. 13 shows an example configuration achieved to store data on a print job, the data being stored in an HDD managed by a job-data-storage server according to the above-described embodiment.

FIG. 13 shows an example configuration achieved to store data on a print job, the data being stored in the HDD 416 managed by the job-data-storage server 414. According to the example shown in FIG. 13, a data-storage-configuration 1311 includes job-ID data 1312 used to uniquely identify a print job in the distribution-print system and data on the print job, that is, job data 1313.

Figure 14:
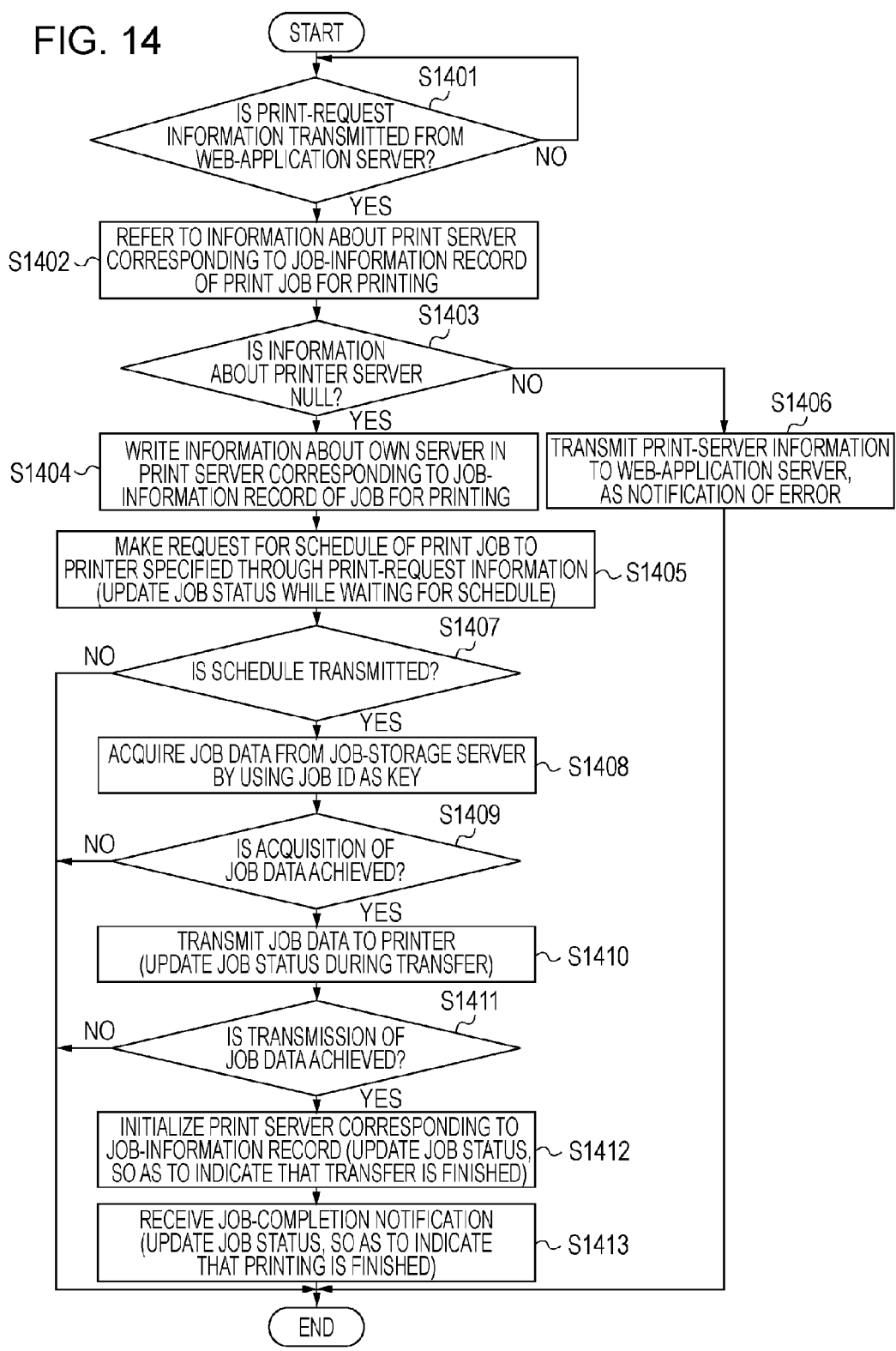
FIG. 14 is a flowchart illustrating example processing procedures performed in the distribution-print system, the processing procedures being performed by the print server for the printer, so as to execute print processing according to the above-described embodiment.

FIG. 14 is a flowchart illustrating example processing procedures performed in the distribution-print system, the processing procedures being performed by the print servers 407 to 410 for the printer 417 to 422, so as to execute print processing.

At step S1401, the print server waits until the print-request information 1001 is transmitted from the Web-application server. When the print-request information 1001 is transmitted, the processing advances to step S1402.

Thus, in the above-described embodiment, an accepting unit configured to accept a request for the job submission is achieved through the processing procedures performed at step S1401.

Then, the print server makes a request of the database server 413 to acquire the job-information record corresponding to the job-ID data 1003 of the print-request information 1001 transmitted at step S1401. The database server 413 refers to the job-information table 701 on which data is stored in the HDD 415, and extracts the job-information record 702 including the job-ID data 703 agreeing with the job-ID data 1003 from the job-information table 701. Then, the database server 413 transmits the extracted job-information record 702 to the print server, as a response to the request. Then, the print server refers to the print-server data 706 included in the transmitted job-information record 702.

Next, at step S1403, the print server determines whether the value of the print-server data 706 referred to at step S1402 is null. If the determination result shows that the value of the print-server data 706 is not null, the processing advances to step S1406. Then, the print server acquires the print-server data 706 and transmits the acquired print-server data 706 to the Web-application server in addition to an error notification.

If the value of the print-server data 706 referred to at step S1402 is null at step S1403, the processing advances to step S1404. Then, the print server makes a request of the database server 413 to write the IP address (and/or the host name) of the print server in the print-server data 706 of the job-information record 702. The database server 413 refers to the job-information table 701 and writes the IP address (and/or the host name) of the print server which made the request in the corresponding print-server data 706.

Thus, in the above-described embodiment, (part of) a register-instruction unit is achieved through processing procedures performed at step S1404.

Next, at step S1405, the print server makes a request of the printer specified based on the printer-name data 1002 included in the print-request information 1001 transmitted at step S1401 to acquire information about the schedule of a print job. At that time, the print server makes a request of the database server 413 to update the status data 707 of the job-information table 701 to "waiting for schedule". The database server 413 refers to the job-information table 701 and updates the corresponding status data 707 to "waiting for schedule".

Thus, in the above-described embodiment, (part of) the register-instruction unit is achieved through processing procedures performed at step S1405.

Next, at step S1407, the print server determines whether the print-job-schedule information is transmitted from the printer which made the request for the acquisition of the print-job-schedule information. If the determination result shows that the print-job-schedule information is not transmitted, the processing procedures shown in the flowchart of FIG. 14 are finished.

On the other hand, if the print-job-schedule information is transmitted, the processing advances to step S1408. Then, the print server makes a request of the job-storage server 414 to acquire data on the print job corresponding to the job-ID data 1003 included in the print-request information 1001 transmitted at step S1401. The job-data-storage server 414 refers to the data-storage-configuration 1311 (a table) on which data is stored in the HDD 416, and extracts the job data 1313 on the print job corresponding to job-ID data 1312 agreeing with the job-ID data 1003. Then, the job-data-storage server 414 transmits the job data 1313 on the print job to the print server, as a response to the request. Consequently, the print server acquires data on the print job corresponding to the job-ID data 1003 included in the print-request information 1001 transmitted at step S1401.

Next, at step S1409, the print server determines whether the acquisition of the job data 1313 on the print job is achieved. If the determination result shows that the acquisition of the job data 1313 on the print job is not achieved, the processing procedures shown in the flowchart of FIG. 14 are finished. On the other hand, if the acquisition of the job data 1313 on the print job is achieved, the processing advances to step S1410. Then, the print server makes a request of the database server 413 to acquire information about the printer corresponding to the printer-name data 1002 included in the print-request information 1001 transmitted at step S1401.

The database server 413 refers to the printer-information table 901 and extracts the record (printer information) of the printer corresponding to the printer-name data 1002. The database server 413 transmits data on the extracted record (the printer information) to the print servers 407 to 410, as a response to the request. Consequently, the print server acquires information about the printer corresponding to the printer-name data 1002 included in the print-request information 1001. Then, the print server transmits the acquired job data 1313 on the print job to a printer identified based on the printer-identification information 903 included in the acquired printer information. At that time, the print server makes a request of the database server 413 to update the status data 707 of the job-information table 701 to "transferring". The database server 413 refers to the job-information table 701 and updates the corresponding status data 707 to "transferring".

Thus, in the above-described embodiment, (part of) the registration-instruction unit is achieved through the processing procedures performed at step S1410.

Next, at step S1411, the print server determines whether the transmission of the job data 1313 on the print job is achieved. If the determination result shows that the transmission of the job data 1313 is not achieved, the processing procedures shown in the flowchart of FIG. 14 are finished.

On the other hand, when the transmission of the job data 1313 is achieved (when the transfer of the job data 1313 on the print job is successfully completed), the processing advances to step S1412. Then, the print server makes a request of the database server 413 to update the status data 707 of the job-information table 701 to "transfer is finished". The database server 413 refers to the job-information table 701 and updates the corresponding status data 707 to "transfer is finished". Further, the print server makes a request of the database server 413 to delete (empty) the print-server data 706. The database server 413 refers to the job-information table 701 and deletes (empties) the corresponding print-server data 706.

Thus, in the above-described embodiment, (part of) the registration-instruction unit is achieved through the processing procedures performed at step S1412. Further, in the above-described embodiment, transfer processing is started at step S1404 and the transfer processing is finished at step S1413 (However, the job submission is finished at step S1412). That is to say, in the above-described embodiment, a submission unit is achieved through processing procedures performed at steps S1404 to S1413.

Next, at step S1413, upon receiving job-completion-notification data transmitted from the printer which had transmitted the job data 1313 on the print job, the print server performs the following processing. Namely, the print server makes a request of the database server 413 to update the status data 707 of the job-information table 701 to "printing is completed". The database server 413 refers to the job-information table 701 and updates the corresponding status data 707 to "printing is completed".

FIG. 15 exemplarily shows how the status data 707 on the print job is changed, where the status data 707 is updated by the print servers 407 to 410 provided in the distribution-print system of the above-described embodiment. The status data 707, which shows the progress of the print processing, is updated by being affected by the processing status of each of the print servers 407 to 410 and/or data on the status of each of the printers 417 to 422, the data being transmitted from the printer to the device-monitor unit 506.

When an instruction to execute printing is not yet transmitted at step S1101 shown in FIG. 11, the status data 707 on the print job indicates "waiting", as shown in a box 1501. That is to say, the status data 707 on a print job for which any of the print servers 407 to 410 does not perform printing indicates "waiting", as shown in the box 1501. When the print processing corresponding to steps S1407 to S1410 is started in each of the print servers 407 to 410 after the processing procedures shown in the flowcharts of FIGS. 11 and 12 are finished, the status data 707 on the print job indicates "waiting for schedule", as shown in a box 1502, at step S1405.

When the job data 1313 on the print job is transmitted from the print server to the printer at step S1410 shown in FIG. 14, the status data 707 on the print job indicates "transferring", as shown in a box 1503. Further, when the transmission of the job data 1313 on the print job is completed at step S1412, the status data 707 on the print job indicates "transfer is finished", as shown in a box 1504. Further, at step S1413, when printing is finished (sheet ejection is finished) in the printer, the printer notifies the print server that the printing is finished, and the status data 707 on the print job indicates "finished normally", as shown in a box 1506, and/or "finished as error", as shown in a box 1507 based on the above-described notification.

When the value of the print-server data 706 is not null during the processing procedures corresponding to step S1206 shown in FIG. 12, the processing procedures being performed by the Web-application servers 404 to 406, the status data 707 on the print job indicates "waiting for schedule", as shown in the box 1502, "transferring", as shown in the box 1503, or "transfer is finished", as shown in the box 1504. If the status data 707 on the print job indicates information other than the above-described information, the value of the print-server data 706 becomes null. In the above-described embodiment, when each of the Web-application servers 404 to 406 transmits the print-request information 1001 to any of the print servers 407 to 410 for which load balancing is performed, a print server to which the print-request information 1001 is transmitted is determined based on the status data 707 on the print job.

If the status data 707 on the print job indicates "waiting for schedule", as shown in the box 1502, "transferring", as shown in the box 1503, and "transfer is finished", as shown in the box 1504, that is to say, if the print-server data 706 exists, the print-request information 1001 is transmitted to the print server identified based on the print-server data 706. On the other hand, if the print-server data 706 is null, that is to say, if the status data 707 on the print job indicates "waiting", as shown in the box 1501, "transfer is finished", as shown in the box 1504, "printing", as shown in the box 1505, "finished normally", as shown in the box 1506, and "finished as error", as shown in the box 1507, the print-request information 1001 is transmitted to the balancer 412.

Thus, in the above-described embodiment, the Web-application servers 404 to 406 receive the print-request information 1001 transmitted from the client PCs 401 to 403. Then, each of the Web-application servers 404 to 406 acquires the job-information record 702 corresponding to the printer-name data 1002 included in the transmitted print-request information 1001. The job-information record 702 indicates information about the print job. The job-information record 702 includes a record indicating a print server performing print processing for the print job (the print-server data 706).

Then, if the value of the print-server data 706 is not null, the Web-application servers 404 to 406 transmit the print-request information 1001 to a print server identified based on the value of the print-server data 706, so as to instruct to perform print processing. Thus, in the above-described embodiment, if a print server performing the print processing for a printer specified as the destination of print-job submission exists, the print server is instructed to execute printing.

Therefore, the print-request-information items 1001 intended for the same printer are transmitted to the print servers 407 to 411 in the order in which the print-request-information items 1001 are generated. Consequently, in an environment where each of the print servers 407 to 410 controls print jobs submitted to the printers 417 to 422, print jobs intended for the same printer can be submitted to the printer in the order in which requests are made by the client PCs 401 to 403.

OTHER EMBODIMENTS

Each of units included in the job-submission-request apparatus, the job-submission apparatus, and the job-submission system according to the above-described embodiment of the present invention, and each of steps included in the job-submission method according to the above-described embodiment can be achieved by an operating program stored in a random-access memory (RAM) and/or a read-only memory (ROM) of a computer. The program and/or a computer-readable recording medium storing the program constitutes another embodiment of the present invention.

Further, each of a system, an apparatus, a method, a program, a storage medium, etc. may constitute another embodiment of the present invention. More specifically, the present invention can be used for a system including plural units, or an apparatus including a single unit only.

Further, program code of software implementing the functions of the above-described embodiment (program code corresponding to the flowcharts shown in FIGS. 11, 12, and 14 in the above-described embodiment) is supplied to the system and/or the apparatus directly and/or remotely. Then, a computer of the system and/or the apparatus reads and executes the supplied program code so that the functions of the above-described embodiments can be achieved, which constitutes another embodiment of the present invention.

Therefore, the program code itself installed in the computer, so as to achieve functional processing of the present invention by the computer, also constitutes another embodiment of the present invention. Namely, a computer program itself provided to achieve the functional processing can constitute another embodiment of the present invention.

In that case, the above-described computer program may be object code, a program executed by an interpreter, script data supplied to an operating system (OS), etc., so long as the computer program has program functions.

A recording medium provided to supply the program may be, for example, a floppy (registered trademark) disk, a hard disk, an optical disk, a magneto-optical disk, a magneto-optical disk (MO), a compact disk (CD)-read only memory (ROM), a CD-recordable (R), a CD-rewritable (RW), etc. The above-described recording medium may further be a magnetic tape, a nonvolatile memory card, a ROM, a digital-versatile disk (DVD) including a DVD-ROM and a DVD-R, etc.

Further, the program may be supplied in the following methods. For example, a user accesses a home page established on the Internet by using a browser of a client computer. Then, the user downloads the computer program itself of the present invention from the home page and/or compressed file data including data on an automatic-install function to a recording medium such as a hard disk.

Further, the program can be supplied by dividing program code generating the program of the present invention into plural file-data items and downloading the file-data items from different home pages. Namely, a WWW server provided to download program-file-data items used to achieve the functional processing of the present invention by using a computer to plural users also constitutes another embodiment of the present invention.

Further, the program of the present invention may be encoded and stored in storage mediums such as CD-ROMs distributed to users. Then, key information used to decode the encoded program may be downloaded from the home page to a user satisfying predetermined conditions via the Internet. Through the use of the downloaded key information, the encoded program can be executed and installed in a computer so that the program is supplied to the system and/or the apparatus.

Further, not only by the computer reading and executing the read program, but also by the computer executing part of or the entire process utilizing an OS, etc. running on the computer based on instructions of the program, the functions of the above-described embodiments may be achieved.

Further, the program read from the recording medium may be written into a memory of a function-expansion board inserted into the computer and/or a function-expansion unit connected to the computer. Then, a central processing unit (CPU), etc. of the function-expansion board and/or the function-expansion unit may execute part of or the entire process based on instructions of the program so that the functions of the above-described embodiments are achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-221679 filed on Aug. 28, 2007, which is hereby incorporated by reference herein in its entirety.

What is claimed is:

1. An information processing apparatus capable of communicating to a client apparatus that requests output of a print job and a plurality of submission servers each of which submits the print job to a printing device, the information processing apparatus comprising:
a receiving unit configured to receive a request for outputting a print job including designation of a printing device from the client apparatus;
an extracting unit configured to extract a previous print job to be previously submitted to a printing device that is same as the printing device designated by the request received by the receiving unit from among print jobs to be submitted by the plurality of job submission servers, wherein the extracting unit extracts no print jobs, the print job is requested to be submitted to the printing device to a job submission server determined based on a load balancing algorithm from among the plurality of job submission servers;
a referring unit configured to refer to a job submission server that submits the extracted previous print job to the printing device; and
a requesting unit configured to request the job submission server referred by the referring unit to submit the print job to the printing device.

2. The information processing apparatus according claim 1, wherein the extracting unit uses a database which manages a print job to be submitted by each of the plurality of submission servers.

3. A print processing system including:
an information processing apparatus capable of communication to a client apparatus that requests for outputting a print job;
a plurality of job submission servers that each submits a print job to a printing device, and
a database that manages a print job to be submitted by each of the plurality of job submission servers,
wherein the information processing apparatus comprises:
a receiving unit configured to receive a request for outputting a print job including designation of a printing device from the client apparatus;
an extracting unit configured to extract a print job to be submitted to a printing device that is same as the printing device designated by the request received by the receiving unit from among print jobs to be submitted by the plurality of job submission servers;
a referring unit configured to refer to a job submission server that submits the extracted print job to the printing device; and
a requesting unit configured to request the job submission server referred by the referring unit to submit the print job to the printing device,
wherein the job submission server submits the print job to requested for the submission by the requesting unit to the designated printing device, and wherein the job submission server requests a schedule of the print job to the printing device, obtains the print job requested for the submission by the requesting unit based on a notification from the printing device, and submits the obtained print job to the printing device.

4. The print processing system according to claim 3, wherein the job submission server comprises an update unit for updating a progress status of the print job to be submitted by the job submission server.

5. A method for controlling an information processing apparatus capable of communicating to a client apparatus that requests output of a print job and a plurality of submission servers each of which submits the print job to a printing device, the method comprising:

receiving a request for outputting a print job including designation of a printing device from the client apparatus;

extracting a previous print job to be previously submitted to a printing device that is same as the printing device designated by the request received by from among print jobs to be submitted by the plurality of job submission servers, wherein when no print jobs are extracted, the print job is requested to be submitted to the printing device to a job submission server determined based on a load balancing algorithm from among the plurality of job submission servers;

referring to a job submission server that submits the extracted previous print job to the printing device; and requesting the job submission server referred by the referring unit to submit the print job to the printing device.

6. The method according claim 5, wherein in the extracting step a database is used which manages a print job to be submitted by each of the plurality of submission servers.

7. A non-transitory computer-readable storage medium storing a computer-executable process, the computer-executable process causing a computer to execute the method according to claim 5.

8. A non-transitory computer-readable storage medium storing a computer-executable process, the computer-executable process causing a computer to execute the method according to claim 6.

* * * * *